A. BOLANDER.

Mowing Machines.

No. 6,042. Reissued Sept. 8, 1874.

Witnesses.

S. D. Crane

H. S. Abbot

Inventor.

Aaron Bolander

By Daniel Breed Atty.

THE GRAPHIC CO. PHOTO-LITH. 39 & 41 PARK PLACE, N.Y.

UNITED STATES PATENT OFFICE.

AARON BOLANDER, OF AKRON, OHIO.

IMPROVEMENT IN MOWING-MACHINES.

Specification forming part of Letters Patent No. 112,892, dated March 21, 1871; reissue No. 6,042, dated September 8, 1874; application filed February 18, 1873.

*To all whom it may concern:*

Figure 1:
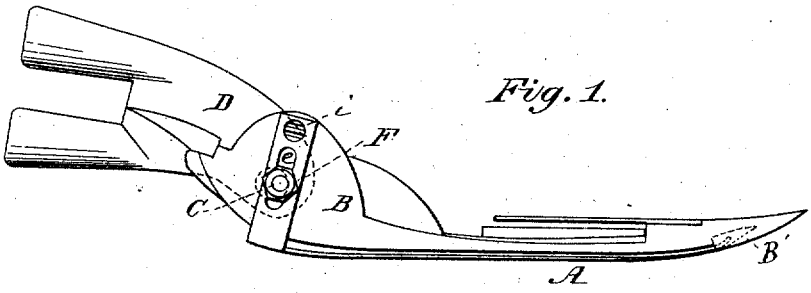
Figure 2:
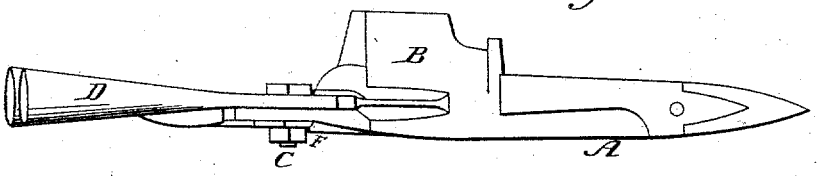
Figure 3:
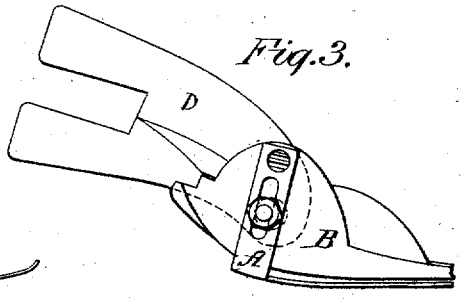
Figure 4:
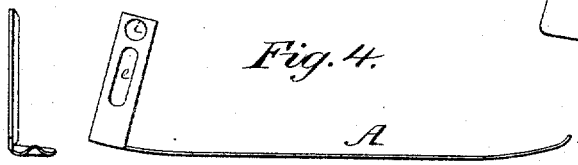
Figure 5:
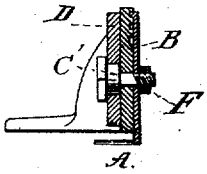

Be it known that I, AARON BOLANDER, of Akron, in the county of Summit and State of Ohio, have invented an Improvement in Harvesters, of which the following is a specification:

In the accompanying drawings, Figure 1 is a side view of a harvester-shoe with my improvements attached. Fig. 2 is a top view of the same. Fig. 3 shows part of the shoe and shoe-spring with the swath-stick more elevated than in Fig. 1. Fig. 4 represents the shoe-spring. Fig. 5 is a section through the eccentric bolt and other parts, which will be hereafter fully explained.

My invention consists of a novel arrangement and combination of shoe, shoe-spring, and swath-stick with an eccentric bolt for adjusting the swath-stick upon the shoe.

My shoe-spring is made of a single bar of steel bent upon itself near the heel, as shown at Fig. 4. The upright portion has a slot, *e*, and hole *i* for inserting the bolt C and adjusting the spring in relation to the shoe. The forward end of the spring has no hook or bolt to fasten it to the shoe, but is inserted loosely into a socket, B′, in the shoe B, Fig. 1. Then the spring is fastened to the shoe by means of the single bolt C, which also connects the swath-stick D to the shoe. This bolt C is made eccentric, one part of the bolt having a greater diameter than the other part, thus forming a shoulder, C′, Fig. 5. The larger portion of this bolt serves as a pivot for the swath-stick or socket D, and the smaller portion extends through the heel of the shoe and spring. By this construction the spring can be tightened upon the shoe by means of the nut F, while the swath-stick is left free to swing up and down, and thus follow the undulations of the ground when the machine is working.

Having thus described my invention, I claim—

1. The combination of the shoe B and spring A, when said spring is attached to the shoe by the bolt, which connects the shoe and swath-stick, and the front end is inserted loosely in and held by a socket only, substantially as and for the purposes set forth.

2. The combination of the bolt C with the shoe B, when the shoe-spring A and the swath-stick D are fastened to the shoe by said bolt, substantially as set forth.

3. The eccentric bolt C, in combination with the swath-stick D and shoe B, substantially in the manner and for the purposes set forth.

AARON BOLANDER.

Witnesses:
DANIEL BREED,
EDM. F. BROWN.